US006182755B1

(12) United States Patent
Mansure (10) Patent No.: US 6,182,755 B1
(45) Date of Patent: Feb. 6, 2001

(54) BELLOW SEAL AND ANCHOR (75) Inventor: Arthur J. Mansure, Albuquerque, NM (US)

(73) Assignee: Sandia Corporation, Albuquerque, NM (US)

( * ) Notice: Under 35 U.S.C. 154(b), the term of this patent shall be extended for 0 days.

(21) Appl. No.: 09/109,000

(22) Filed: Jul. 1, 1998

(51) Int. Cl.[7] .......................... E21B 23/00; E21B 33/12; E21B 33/128; F16J 3/00
(52) U.S. Cl. ..................... 166/180; 166/196; 277/337; 277/340; 277/636
(58) Field of Search .................... 166/180, 196, 166/179, 206, 216; 277/323, 340, 338, 337, 336, 636, 635

(56) References Cited

U.S. PATENT DOCUMENTS

| | | | |
|---|---|---|---|
| 49,599 | * 8/1865 | Sicouret | 277/340 |
| 171,589 | * 12/1875 | Stewart | 277/340 |
| 171,616 | * 12/1875 | Hardison | 166/189 |
| 248,229 | * 10/1881 | Stewart | 277/337 |
| 250,929 | * 12/1881 | Lewis | 277/340 |
| 266,848 | * 10/1882 | Lewis | 277/337 |
| 2,222,846 | * 11/1940 | Johnson | 166/184 |
| 3,529,836 | * 9/1970 | Hyde | 277/323 |
| 4,116,451 | * 9/1978 | Nixon et al. | 277/116 |
| 4,332,401 | 6/1982 | Stephenson et al. | 138/149 |
| 4,979,570 | 12/1990 | Mody et al. | 166/187 |
| 5,119,861 | 6/1992 | Pino | 138/93 |
| 5,143,158 | 9/1992 | Watkins et al. | 166/344 |
| 5,185,806 | 2/1993 | Dolby et al. | 381/106 |
| 5,222,746 | * 6/1993 | Van Steenbrugge | 277/212 |
| 5,249,814 | * 10/1993 | Halling | 277/206 |
| 5,273,109 | 12/1993 | Arizmendi | 166/123 |
| 5,303,518 | 4/1994 | Strickland | 52/21 |
| 5,348,087 | 9/1994 | Williamson, Jr. | 116/115 |
| 5,421,241 | 6/1995 | Terral | 92/42 |
| 5,961,388 | * 10/1999 | Breidenbach et al. | 464/133 |

FOREIGN PATENT DOCUMENTS 2157449   9/1995   (CA).

* cited by examiner

Primary Examiner—Paul N. Dickson
Assistant Examiner—Joselynn Sliteris
(74) Attorney, Agent, or Firm—Russell D. Elliott (57) ABSTRACT

An annular seal is made of a collapsible bellows. The bellows can function as an anchor or a seal and is easily set into position using relative component movement. The bellows folds can be slanted and their outer sealing edges can have different profiles to meet expected conditions. The bellows is expanded for insertion to reduce its outer dimension and sets by compaction as a result of relative movement. The bellows can be straight or tapered and is settable with a minimal axial force.

23 Claims, 7 Drawing Sheets

BELLOW SEAL AND ANCHOR

This invention was made with support from the United States Government under contract DE-AC04-94AL85000 awarded by the U.S. Department of Energy. The Government has certain rights in this invention.

FIELD OF THE INVENTION

The field of this invention relates to sealing or anchoring devices, particularly those useful for downhole service as packers or anchors.

BACKGROUND OF THE INVENTION

Many types of devices for sealing or anchoring in a passage which is meant to include open or cased holes are known in the art. Some types involve mechanical squeezing of sealing elements by longitudinal relative movement which results in radial expansion of the sealing elements to close off a wellbore. One example of such a packer is a retrievable design shown in U.S. Pat. No. 5,273,109. Other designs are known as inflatables and can be advanced thru-tubing. Typical of such designs is U.S. Pat. No. 4,979,570. These designs incorporate an inflatable element generally covered by overlapping slats with one or more sleeves to act as sealing elements covering a portion of the overlapping slats.

The packers that compress annular seals longitudinally to squeeze them in the radial direction can require radial expansions as much as 10%, which necessitates considerable longitudinal or axial force. Some seals have been made hollow or porous to reduce the force required to set them. However, hollow or porous seals are subject to decrease in size or collapse as the pressure increases and, thus, are unsuitable for high ambient pressures.

One of the objects of the present invention is to overcome the high setting forces required for prior designs so that a packer or plug can be provided which requires only minimal force to engage and disengage or change the size of the seal. Another objective of the present invention is to provide a seal whose performance is unaffected by ambient pressure.

Bellows of one type or another have been used for expansion joints to compensate for thermally induced forces. U.S. Pat. No. 4,332,401 illustrates an expansion joint for casing used in injecting steam into wells. U.S. Pat. No. 5,421,241 illustrates the use of a bellows in a gas lift valve construction. U.S. Pat. No. 5,143,158 illustrates the use of bellows in a subsea wellhead apparatus. U.S. Pat. No. 5,119,861 illustrates the use of compressible elastomers to create a pipe plug. Also of interest in the general area of sealing devices are U.S. Pat. Nos. 5,348,087; 2,157,449 (Canadian); U.S. Pat. Nos. 5,303,518; 5,185,806; 5,119,861; as well as a multi-component compressible sealing member sold under the trademark HEXPAK® by Petroleum Engineering Services Inc. of Houston, Tex. This packer employs a sealing element system made of an outer elastomer membrane that is wrapped around a metal sleeve seal mandrel. An inner elastomer provides rubber pressure during pack-off to expand the seal mandrel and ensure solid pack-off state is achieved and molding to the inner casing contour is perfected.

The prior designs for seals leave unanswered the need for a sealing device which sets with low forces yet reliably seals against differential pressures, such as in downhole applications. The apparatus of the present invention employs an annular bellows as the seal element which requires minimal force to engage and disengage or change in size. One of the objects of the present invention is to allow a bellows to significantly change its diameter as compared to prior designs involving compression of elements with an axial force. Another objective of the invention is to provide a bellows that can be made from solid materials so that its performance is not affected by ambient pressures. Bellows elements can be readily stacked to achieve multiple independent sealing surfaces without additional design complexity or required increases in engagement force. Accordingly, using the bellows of the present invention, if only one of the multiple ribs which contact the outer pipe are in a pit or crack-free location, the seal becomes effective. Another object of the invention is to provide a greater seal the higher the differential pressure applied. Another objective is to minimize extrusion potential and damage by virtue of the configuration of the design, which facilitates the sealing process, even if there is misalignment of the components supporting the bellows or variability in pipe diameter. Another objective is to be able to make the bellows seal from a wide variety of materials, all of which can functionally operate due to the low engagement force required. These and other objectives will become more apparent to those of skill in the art from a review of the preferred embodiments described below.

SUMMARY OF THE INVENTION

An annular seal is disclosed made of a collapsible bellows. The bellows can function as an anchor or a seal and is easily set into position using relative component movement. The bellows folds can be slanted and their outer sealing edges can have different profiles to meet expected conditions. The bellows is expanded for insertion to reduce its outer dimension and sets by compaction as a result of relative movement. The bellows can be straight or tapered and is settable with a minimal axial force.

DETAIL DESCRIPTION OF THE DRAWINGS

FIG. 7 is a view of a tapered bellows in the expanded position for run-in.

DETAILED DESCRIPTION OF THE PREFERRED EMBODIMENT

Figure 1:
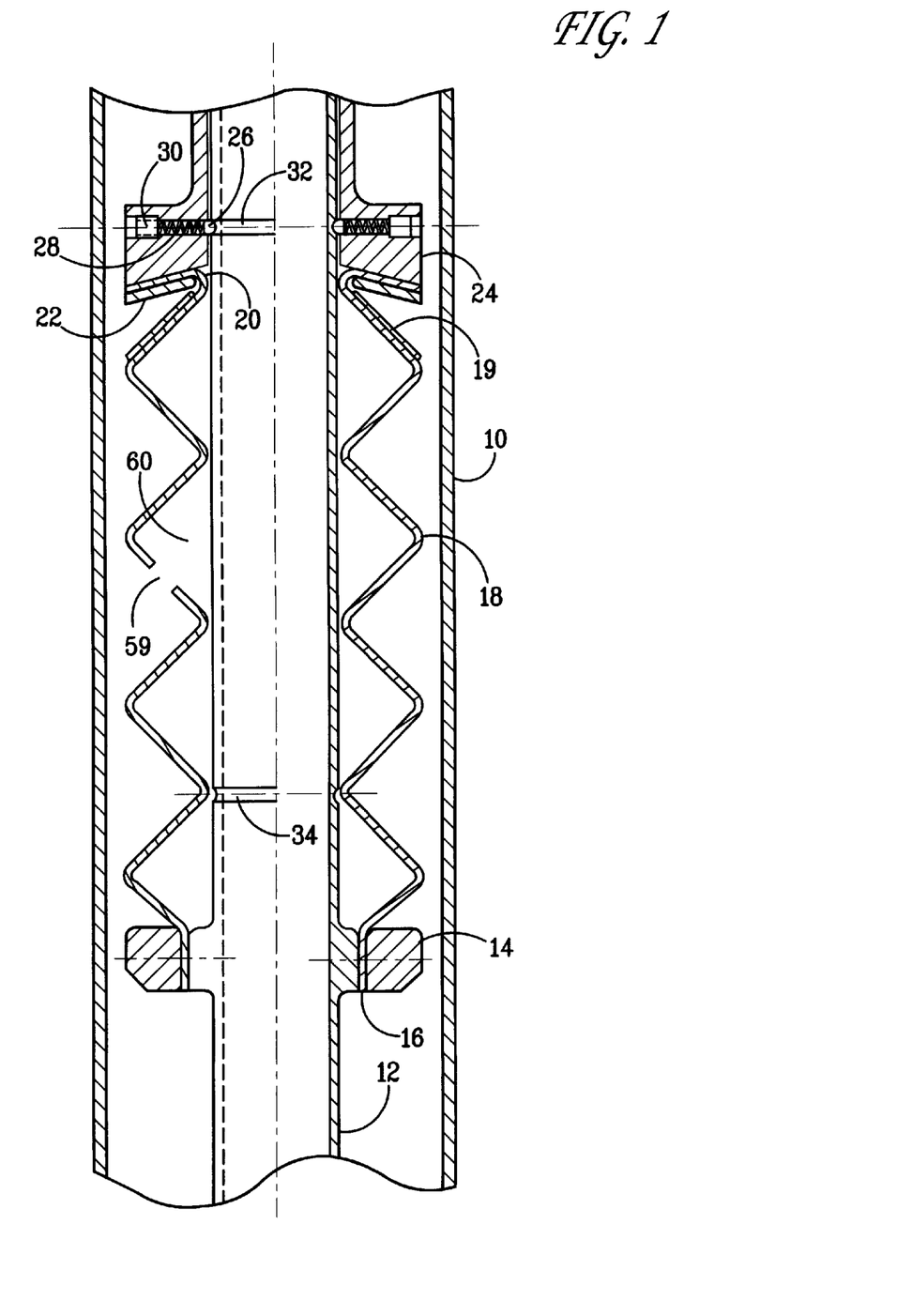
FIG. 1 shows the bellows in an expanded position within casing.
Figure 2:
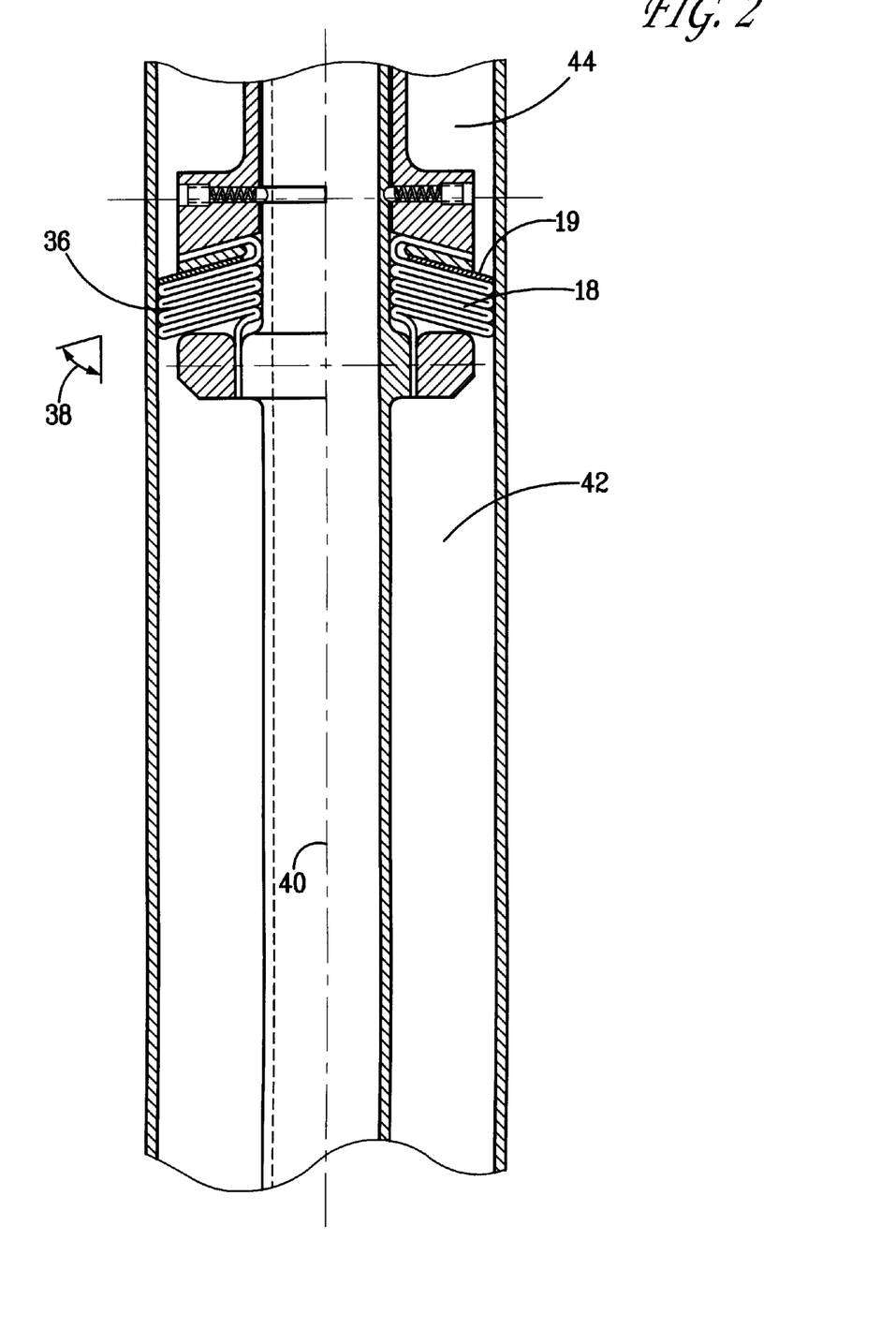
FIG. 2 is the view of FIG. 1, showing the bellows compacted.
Figure 3:
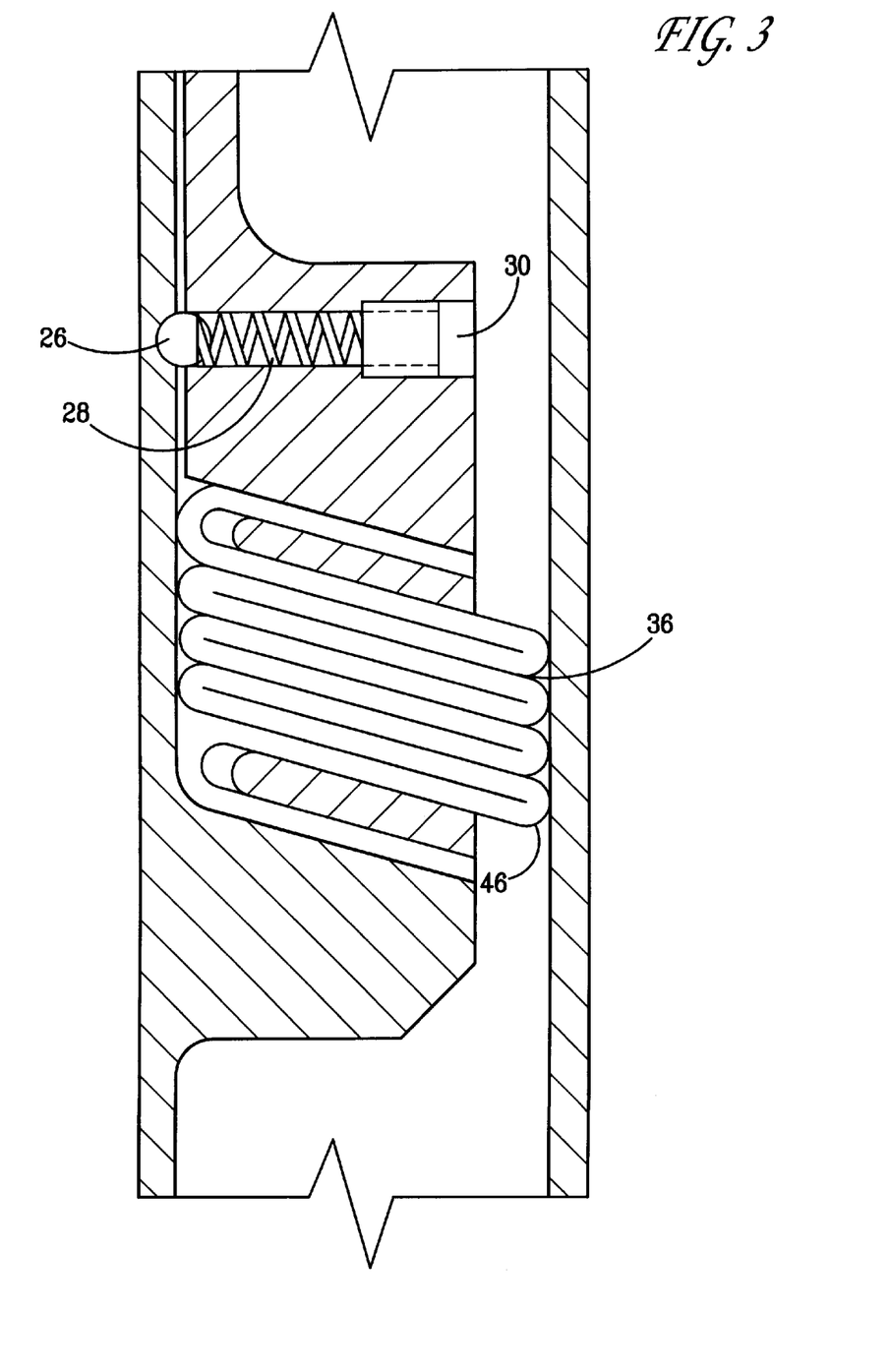
FIG. 3 is a detailed view of the compacted bellows, showing rounded edges for sealing.
Figure 4:
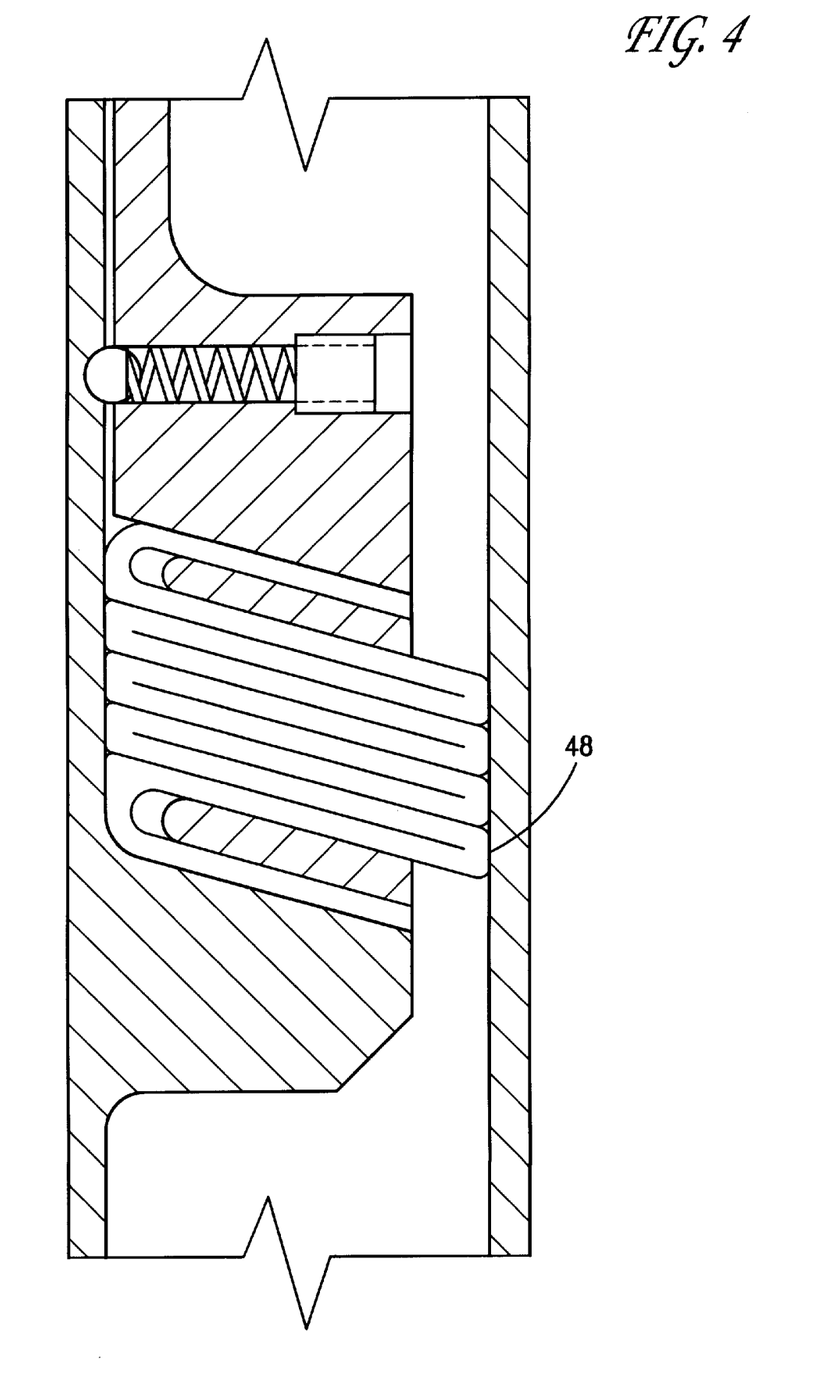
FIG. 4 is an alternative of FIG. 3, showing flat edges on the bellows for sealing.

FIGS. 1 and 2 represent a schematic view of the preferred embodiment of the present invention. As shown in FIG. 1, the wellbore, which includes uncased as well as casing 10, is to be sealed off in a typical wellbore. Although the invention is well suited for wellbore applications, use as an anchor or a plug in any passage is contemplated. "Passage" as used herein includes wellbores. There are two components that move relatively to accomplish this objective. An inner tube or mandrel 12 includes a collar 14 which supports end 16 of bellows 18. In the embodiment of FIG. 1, the bellows 18 is straight cut, illustrating a zigzag pattern. However, other types of collapsible bellows are also within the scope of the invention. The bellows 18 can be made of any material resilient enough to be formed into a bellows and which can fold and extend without damage and is compatible with well fluids and temperatures. Some examples are rubber and PTFE. The opposite end 20 of the bellows 18 is retained to a retaining ring 22 which is optionally mounted to a latch collar 24. In this option the collar 24 has a ball 26 which is biased by spring 28, which is in turn held in position by a plug 30. These components can be more clearly seen in FIG. 3. Ball 26 initially sits in groove 32 during run-in, thus helping to hold the bellows 18 in the expanded position where it has a smaller diameter to facilitate running in. When fully compressed as shown in FIGS. 3 or 4, the bellows increases in outer diameter by over 10% from its expanded position to its compressed position and the ball 26 lands in groove 34, shown in FIG. 1 to assist in holding the bellows 18 in the compressed position such as shown in FIGS. 3 and 4. The latch collar 24 is held in position a sufficient distance from collar 14 to allow expansion of the bellows 18 to reduce its outside diameter for run-in. Since FIG. 1 is a schematic drawing, those skilled in the art will appreciate that known techniques involving relative movement for setting packer elements of the elastomeric type can be employed in actuation of the bellows 18 from the position shown in FIG. 1 to the position shown in FIG. 2. Thus, for example, any type of running tool that can either hold the mandrel 12 stationary while advancing the latch collar 24 or vice versa (which is preferred) i.e., holding the latch collar 24 stationary while picking up the mandrel 12 will result in compaction or folding of the bellows 18 from the position shown in FIG. 1 to the position shown in FIG. 2. The preferred technique, showing the uphole advancement of the collar 14, is illustrated in FIG. 2. Various releasable locks can optionally hold the set position of FIG. 2 and can be overcome with a force to break a pin that holds a lock ring to allow reextension after compaction. The bellows 18 can also be expanded by fluid pressure which drives a movable piston, holding one end of the bellows 18 away from an opposing fixed end. Setting can be accomplished by relative movement which can displace fluid from under the bellows 18 or a piston connected to it. Alternatively, the piston can be held by fluid pressure in the bellows expanded position and returned to a bellows compacted position by a return spring or applied fluid force. Other known variations to accomplish relative movement in a packer to set its sealing element can be employed without departing from the spirit of the invention.

FIG. 2 also illustrates the use of beveled washers known as Belville washers 19 as a backup for the bellows 18. Washer or washers 19 can fold toward a flat position to reduce the size of the extrusion gap for the bellows 18. The washer 19 can also be incorporated into the bellows 18 or otherwise positioned between the collar 24 and the bellows 18 as shown in FIG. 1. The washer 19 reduces the gap to less than 0.01 inch which is comparable to a narrow range of gaps where O-rings are used.

Figure 8:
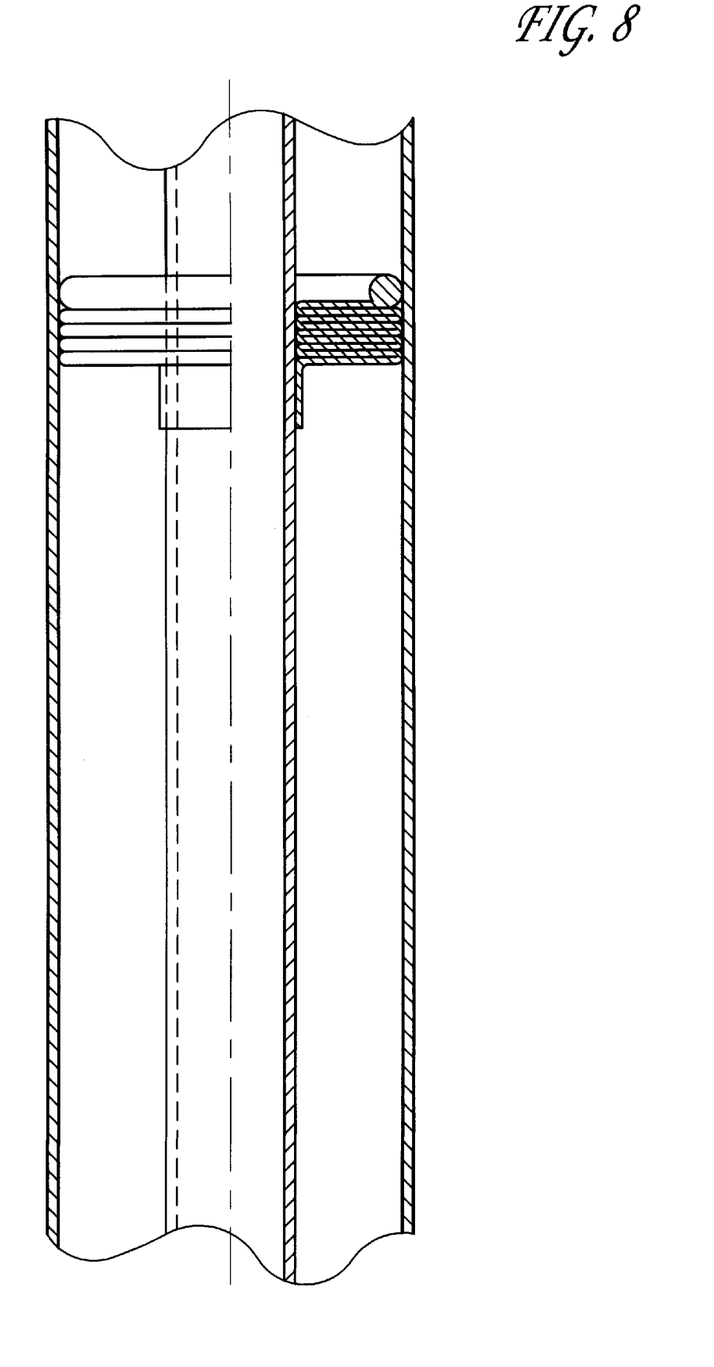
FIG. 8 is the view of FIG. 7 with the bellows in a compressed position for sealing in the casing.

The folds 36 of the bellows 18 can have a slope as indicated by arrow 38 with respect to the longitudinal axis 40. The sloping feature gives the folds 36 a chevron-like appearance when collapsed and further assists in resisting differential pressures which are higher in the downhole region 42 than in the uphole region 44. The slope angle if used can be as high as about 60°, or as shown in FIG. 8, it can be eliminated completely. Variations of the folds 36 are shown in FIGS. 3 and 4. A similar angle is indicated for the disposition of the folds 36 in FIGS. 3 and 4, as shown in FIG. 2. In FIG. 3, the edges 46 are rounded, while in FIG. 4, the edges 48 are squared off or flat.

Figure 7:
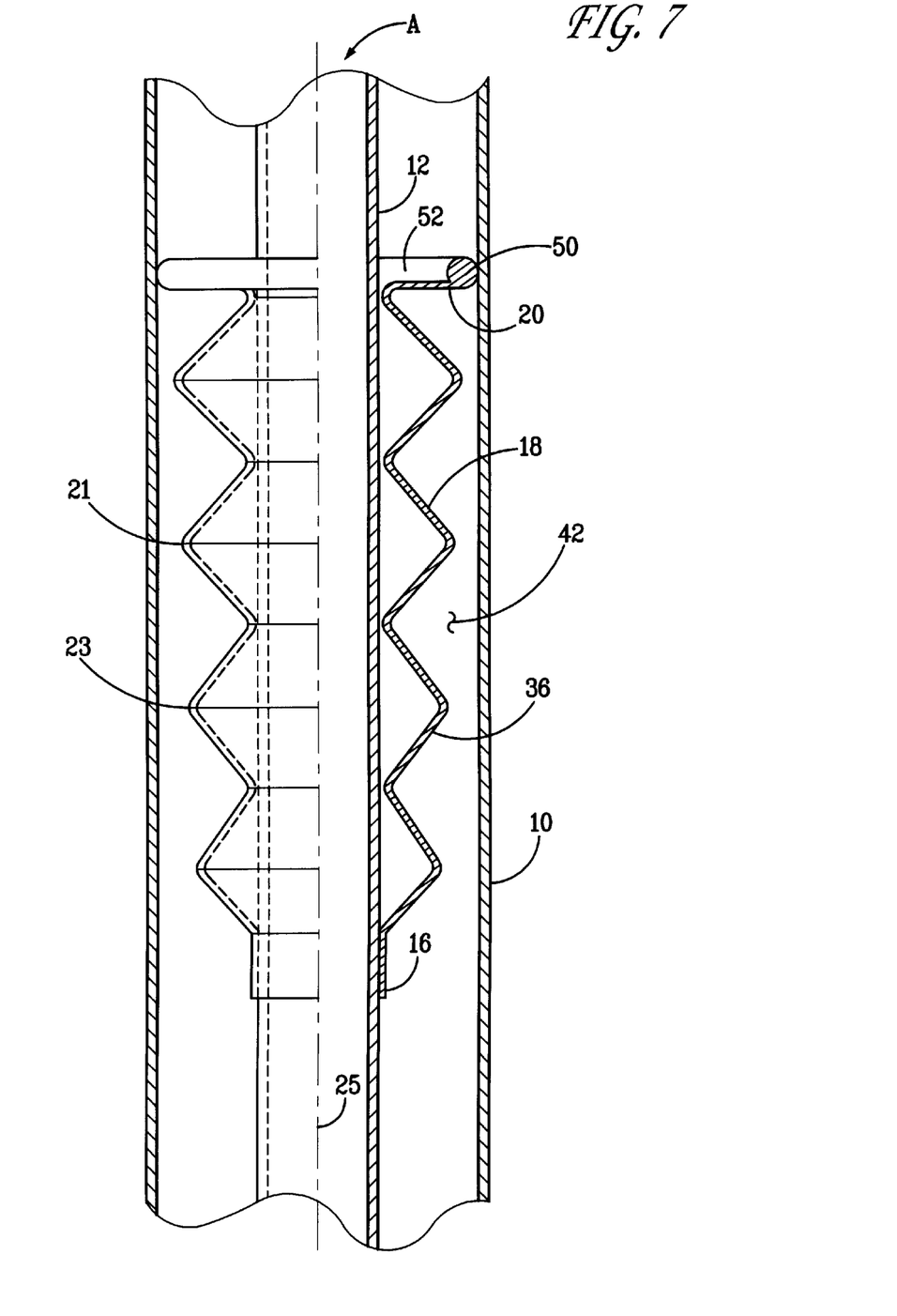

Referring now to FIG. 7, an alternative design for the bellows 18 is illustrated in that there is a decreasing taper toward the downhole region 42. The end 16 is attached directly to the mandrel 12, while the opposite end 20 is secured to a ring 50. Ring 50 can drag on the casing 10 to expand the taper bellows during run-in. When the assembly A has reached the desired depth in the casing 10, an upward pull is applied to the mandrel 12 to set the tapered bellows as shown in FIG. 8. A slant feature to the folds 36, as shown in FIGS. 3 and 4, can also be incorporated in the design of FIGS. 7 and 8. The ring 50 provides sufficient resistance to allow the folds 36 to compress, as shown in FIG. 8, when an upward pull is applied to the mandrel 12. Ring 50 is connected to a sleeve 52 which may be engaged by setting tools of known designs for the creation of relative movement between sleeve 52 and mandrel 12 to allow re-extension of the bellows 18 for removal from the wellbore. Sleeve 52 may also be hydraulically actuated. In an alternative embodiment, ring 50 can be integrated with bellows 18 as a thick end section so that it fits loosely over mandrel 12. In this embodiment, sleeve 52 would not be used for setting bellows 18. Ring 50 can be the same material as bellows 18 or another material compatible with wellbore conditions. Bellows 18 can be made with an internal threaded nipple at end 16 and the mandrel 12 can be simply screwed into the nipple for rapid assembly. When ring 50 drags on casing 10 during run-in, the bellows 18 is extended. When the proper depth is reached, the mandrel 12 is picked up and with ring 50 against the casing 10, the bellows 18 is compressed. One form of release is to fail the connection at end 16 by an upward pull on the mandrel 12 so as to literally pull the mandrel 12 out through ring 50. The ring 50 is later fished and when pulled uphole extends the bellows 18 for retrieval.

The various designs including that shown in FIG. 7 can also be actuated with a misalignment between mandrel 12 and casing 10. Some misalignment between mandrel 12 and ring 20 can also be tolerated so long as it doesn't prevent relative movement of mandrel 12 with ring 50 engaged to the casing 10. Misalignment in the order of about 30° can be tolerated.

Figure 5:
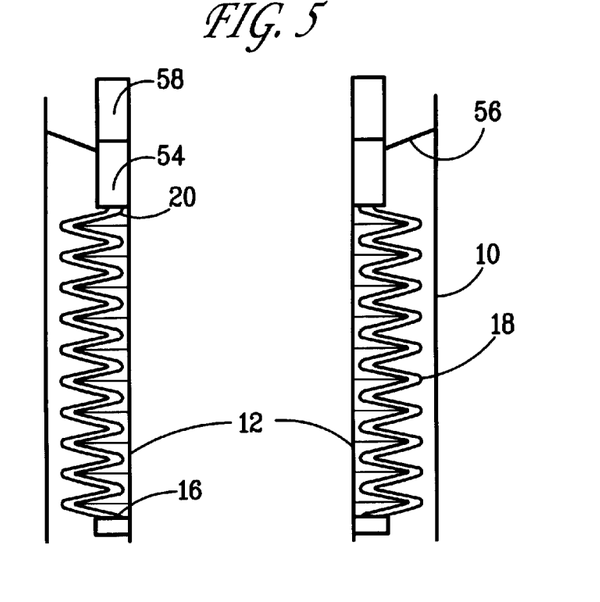
FIG. 5 is an alternative embodiment to FIG. 1, showing a slidable collar employing a drag device to allow the bellows to expand during insertion.
Figure 6:
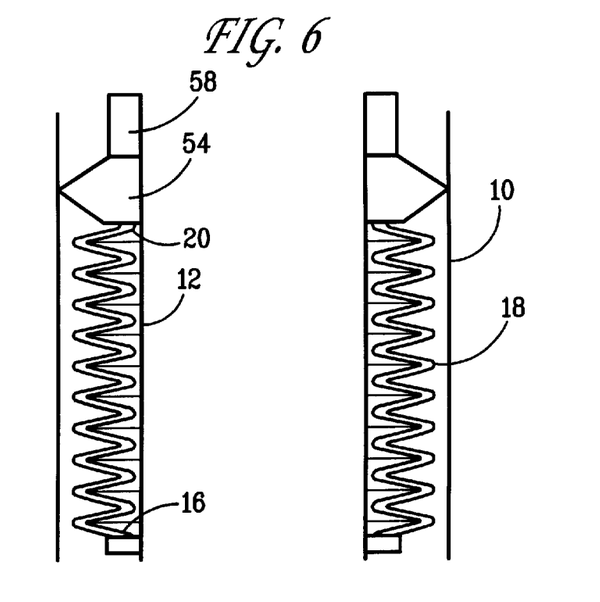
FIG. 6 is an alternative to FIG. 5 where a slidable collar directly drags on the wellbore during insertion to expand the bellows.

Yet another alternative to the preferred embodiment of the present invention is illustrated in FIGS. 5 and 6. In FIG. 5, the bellows 18 is retained on end 16 to the mandrel 12. The opposite end 20 is retained to a sliding collar 54, which has a drag device such as a spring-like extension member 56 extending therefrom. Collar 54 can alternatively have teeth to bite into casing to allow compression and subsequent reextension of the bellows 18. The drag device 56 can ride on the casing 10 to urge the bellows 18 into an expanded position for run-in. Upon reaching the desired depth, the mandrel 12 is picked up and the drag device 56 engages the casing 10 to allow compression of the bellows 18. A retrieval tool of a known design, shown schematically as 58, retains the slide collar 54 as the mandrel 12 is pushed downwardly to again extend the bellows 18 so that it can be retracted from the wellbore. The design in FIG. 6 is similar to that in FIG. 5 except that the sliding collar 54 can drag directly on the casing 10 so as to provide sufficient resistance to expand the bellows 18 for run-in and to provide sufficient initial grip to allow folding of the bellows 18 into a sealing engagement with the casing 10. Retrieval of the seal of FIG. 6 again involves the use of a known retrieving tool to grab the sliding collar 54 and hold it in position as the mandrel 12 is pushed downhole to again re-expand the bellows 18 to reduce its outside diameter so that it can be pulled out of the hole.

It should be noted that the slope built into the latch collar 24, or other back-up device for the bellows 18, enhances the performance of the bellows 18 because it facilitates the folding of the folds 36 during relative movement between the mandrel 12 and the latch collar 24. Ideally, the inside diameter of the bellows 18 should be such that when it is in a relaxed state, that is neither compressed nor extended, the bellows 18 slides without binding over the mandrel 12. Normally, the outside diameter of the bellows 18 should be such that when in a relaxed state, the bellows 18 touches the inside diameter of the casing 10. As shown in FIGS. 5 and 6, the bellows 18 is normally inserted in an orientation where the slide collar 54 is on the low-pressure side of the seal. The other end 16 of the bellows 18 is firmly attached to the mandrel 12. A sloping back-up member such as latch collar 24 or even slide collar 54, as shown in FIGS. 5 or 6, acts to eliminate gaps and any potential to extrude the bellows material. As shown in FIGS. 3 and 4, the outer edge of the bellows is shaped to modify the footprint of the bellows 18. FIG. 4 illustrates a flat outer shape so that the bellows can more fully fill any void spaces in the inside wall of the casing 10.

To facilitate the collapse of the folds 36, the bellows profile, i.e., size, shape, physical properties, material choice, and taper angle preferably up to about 15°, can be changed such that the folds successfully start folding at the fold 36 closest to the latch collar 24, which is held fixed as the bellows 18 is collapsed. Pitch is the peak-to-peak distance such as between adjacent peaks 21 and 23. Taper is the angle formed by a line connecting peaks 21 and 23 and central axis 25 in the relaxed state for bellows 18. Reverse slope is the angle formed by the folds of bellows 18 shown in FIG. 2 and axis 40. The bellows 18 can have one or more openings 59 so that the fluids or gases, which are contained within the bellows in area 60, can be displaced through such openings 59 to allow the bellows 18 to collapse fully. Other liquid or gas-venting techniques from underneath the bellows in area 60, such as a check valve or a low-pressure reservoir, can be employed without departing from the spirit of the invention.

It should also be noted that the outside diameter of the bellows 18 can be larger than the inside diameter of the casing. However, during run-in when the bellows 18 is in the stretched position, its outside diameter is smaller than the inside diameter of the casing to allow insertion. Upon the completion of relative movement as previously described, using a bellows 18 with its largest fold 36 bigger than the inside diameter of the casing ensures that the fold or folds 36 properly engage the inside surface of the casing 10 and further that such engagement occurs at an angle as represented by arrow 38 of FIG. 2.

Those skilled in the art will appreciate that a variety of known packer designs can be adapted to the bellows seal 18 illustrated in the figures. The bellows 18 can be used in conjunction with slips to further secure its position against differentials from uphole or downhole. The actuation which causes relative movement can be done mechanically or hydraulically, and the movement can be locked in by lock rings of a known design which, for the purposes of removal, can be sheared out through the use of known retrieving tools which provide the necessary forces to cause the appropriate relative motion to release slips and at the same time, stretch or expand the bellows 18. However, since the apparatus of the present invention focuses on the nature of the seal or anchoring device being used and is employable in packers or bridge plugs or anchors of known construction, only the bellows 18 and its mounting details have been shown in detail, while the remaining components of the packer, plug or anchor have either been represented schematically or omitted as details that are well-known to those of ordinary skill in this art.

The design shown in the figures can function as an anchoring mechanism as well as or in lieu of being a seal. If the bellows 18 is metallic, its longitudinal collapse and radial growth against the inside surface of the tubular such as a casing 10 will provide anchoring. The bellows 18 can be a composite which is partly metal and partly an elastomer. In that respect it can function both as an anchor as well a seal. Apart from elastomers such as rubber or soft metals, other materials can be used for the bellows 18. A distinctive feature of the bellows 18 is that minimal force is required for large changes in diameter. This feature makes it possible to use materials that may not be compressible enough to be used in traditional packer designs. For example, PTFE, common sold under the trademark TEFLON®, can be used for the bellows 18. The design of the bellows 18 makes it possible to choose seal materials based on their chemical and temperature resistance, even though they are not compressible enough for traditional packer designs. Another alternative for the bellows design 18 is to provide an overlay of a softer material which is flexible over a harder metallic composite or other nonmetallic bellows so that the softer material engages the inside surface of the casing or tubular 10. This type of construction is also usable in open-hole where there is no casing. In open-hole, there is a need to seal against a potentially irregular outer surface. Accordingly, the advantage of having a continuous surface of soft deformable material for contact with the wellbore wall is desirable.

The taper feature as illustrated in FIG. 7 shows a decreasing taper from top to bottom of the bellows 18. This configuration allows extra drag near the ring 50 to assist in stretching the bellows 18 while it is run into the hole and at the same time minimizing wear at the narrow portion of the bellows 18 from contact with the inside surface of the casing 10. A taper design such as shown in FIG. 7 allows the bellows to work in a wider range of outer tubular diameters while still having some portion of the bellows providing the optimum diameter.

In the preferred embodiment, a latch collar or backing plate 24, whose outer diameter is just under the minimum diameter of the hole, is preferably used adjacent end 20 of the bellows 18. The latch collar 24 protects the bellows seal 18 from abrading against the inside walls of the casing 10 during run-in into the wellbore. It also supplies a back-up to the bellows 18 when it is compressed, as shown in FIG. 2.

Instead of the zigzag design shown in FIG. 1, the folds 36 can be more of a reversing U-bend shape without departing from the spirit of the invention. Instead of the constant pitch shown in FIG. 1, the configuration of the individual folds 36 can vary along the length of the bellows 18. Larger and smaller folds can alternate to create a sawtooth pattern. In one embodiment, alternative folds 36 can be in contact with the inside surface of the casing 10, depending on the initial configuration of the bellows 18. The sliding collar 54, as shown in FIGS. 5 and 6, can also be rotationally released or shearably released to facilitate reexpansion of the bellows 18 for release of the assembly A. One way to facilitate insertion and removal of the assembly A is to temporarily secure the position of the slide collar 54 to the mandrel 12 with the bellows 18 in an expanded position during run-in. Any connection between the mandrel 12 and the sliding collar 54 can be disengaged with a twist force applied to the mandrel 12, using a drag or fixation device such as 56 or direct contact between the sliding collar 54 and the casing 10 as the mechanism for allowing relative rotation. The relative rotation frees the sliding collar 54 from its connection with the mandrel 12 such that upward movement of the mandrel 12 folds the folds 36 of the bellows 18. In order to release, a downward force is placed on the mandrel 12 and a twist in the reverse direction reengages the sliding collar 54 to the mandrel 12 to hold the bellows 18 in the expanded position for removal.

The foregoing disclosure and description of the invention are illustrative and explanatory thereof, and various changes in the size, shape and materials, as well as in the details of the illustrated construction, may be made without departing from the spirit of the invention.

What is claimed is:

1. An anchor or sealing apparatus for use in a passage, comprising:
   a body having a longitudinal dimension;
   a collar, through which said body is movable;
   means for reversibly holding said collar stationary within said passage
   an element comprising a foldable member, including a first portion connected to said collar and a second portion connected to said body, which creates a seal within said passage by folding upon itself when said collar is held stationary within said passage and said body is pulled in a direction generally consistent with the second portion approaching the first portion.
2. The apparatus of claim 1, wherein:
   said element comprises a bellows.
3. The apparatus of claim 2 wherein:
   said collar comprises a stop shoulder including a slope against which at least part of said foldable member rests when it is in a state of being folded upon itself, thereby causing any folds present in said foldable member to generally conform in orientation to the slope of the stop shoulder.
4. The apparatus of claim 3, wherein:
   said stop shoulder slants said folds at an angle of up to about 60° from said longitudinal axis.
5. The apparatus of claim 2, wherein:
   said bellows comprises a plurality of folds defining a tapered profile along a longitudinal axis of said body.
6. The apparatus of claim 5, wherein:
   said taper angle is up to about 15°.
7. The apparatus of claim 2, wherein:
   said bellows comprises a plurality of folds having rounded edges for contact with the passage when said bellows is compressed.
8. The apparatus of claim 2, wherein:
   said bellows comprises a plurality of folds having flat edges for contact with the passage when said bellows is compressed.
9. The apparatus of claim 2, further comprising:
   a fluid relief mechanism to allow fluid located between said bellows and said body to escape when said bellows is being compressed.
10. The apparatus of claim 2, wherein:
    said bellows is metallic.
11. The apparatus of claim 2, wherein:
    said bellows is made in layers with a softer layer exposed to the passage and a harder layer between said softer layer and said body.
12. The apparatus of claim 11, wherein:
    said softer layer extends from end to end and is made of a resilient material.
13. The apparatus of claim 2, wherein:
    said bellows is made of a nonmetallic or a composite material.
14. The apparatus of claim 2, wherein:
    said bellows has folds of different radial dimensions so as to present an irregular edge against the passage when all folds are compressed.
15. The apparatus of claim 2, wherein:
    said collar is releasably secured to said body to hold said bellows in an extended position for run-in or removal and is selectively releasable for relative movement between said collar and said body for compressing or extending said bellows.
16. The apparatus of claim 2, wherein:
    said bellows increases in outer diameter by over 10% from its expanded position to its compressed position.
17. The apparatus of claim 2, wherein:
    said bellows can be actuated to seal the passageway when said body is as much as about 30° askew with respect to the passageway.
18. The apparatus of claim 2, wherein:
    said collar is an integral portion of said bellows.
19. The apparatus of claim 18, wherein:
    said collar and said bellows are made of the same material.
20. The apparatus of claim 2, further comprising:
    a flexible washer mounted between said collar and said bellows to minimize an extrusion gap for said bellows by flexing toward the passage.
21. The apparatus of claim 2 wherein:
    said collar frictionally engages the passage to facilitate extension and compression of said bellows.
22. An anchor or sealing apparatus for use in a passage, comprising:
    a body;
    an element, a portion of which is connected to said body and another portion of which is connected to a collar movably mounted to said body;
    said element comprising a foldable member which is extended for run-in and compressed for contact with the passage responsive to relative movement between said collar and said body;
    wherein said element comprises a bellows and said bellows is connected at one end to said body and at an opposite end to said collar;
    and further wherein said collar frictionally engages the passage to facilitate extension and compression of said bellows.
23. An anchor or sealing apparatus for use in a passage, comprising:
    a body;
    an element, a portion of which is connected to said body and another portion of which is connected to a collar movably mounted to said body;
    said element comprising a foldable member which is extended for run-in and compressed for contact with the passage responsive to relative movement between said collar and said body;
    wherein said element comprises a bellows and said bellows is connected at one end to said body and at an opposite end to said collar;
    and further wherein said collar comprises a releasable detent engageable to said body at two positions corresponding to said bellows being extended and compressed.

* * * * *